Feb. 12, 1935.  B. J. HASKINS  1,990,485
COMPENSATED COIL TESTING APPARATUS
Original Filed April 5, 1933  2 Sheets—Sheet 1
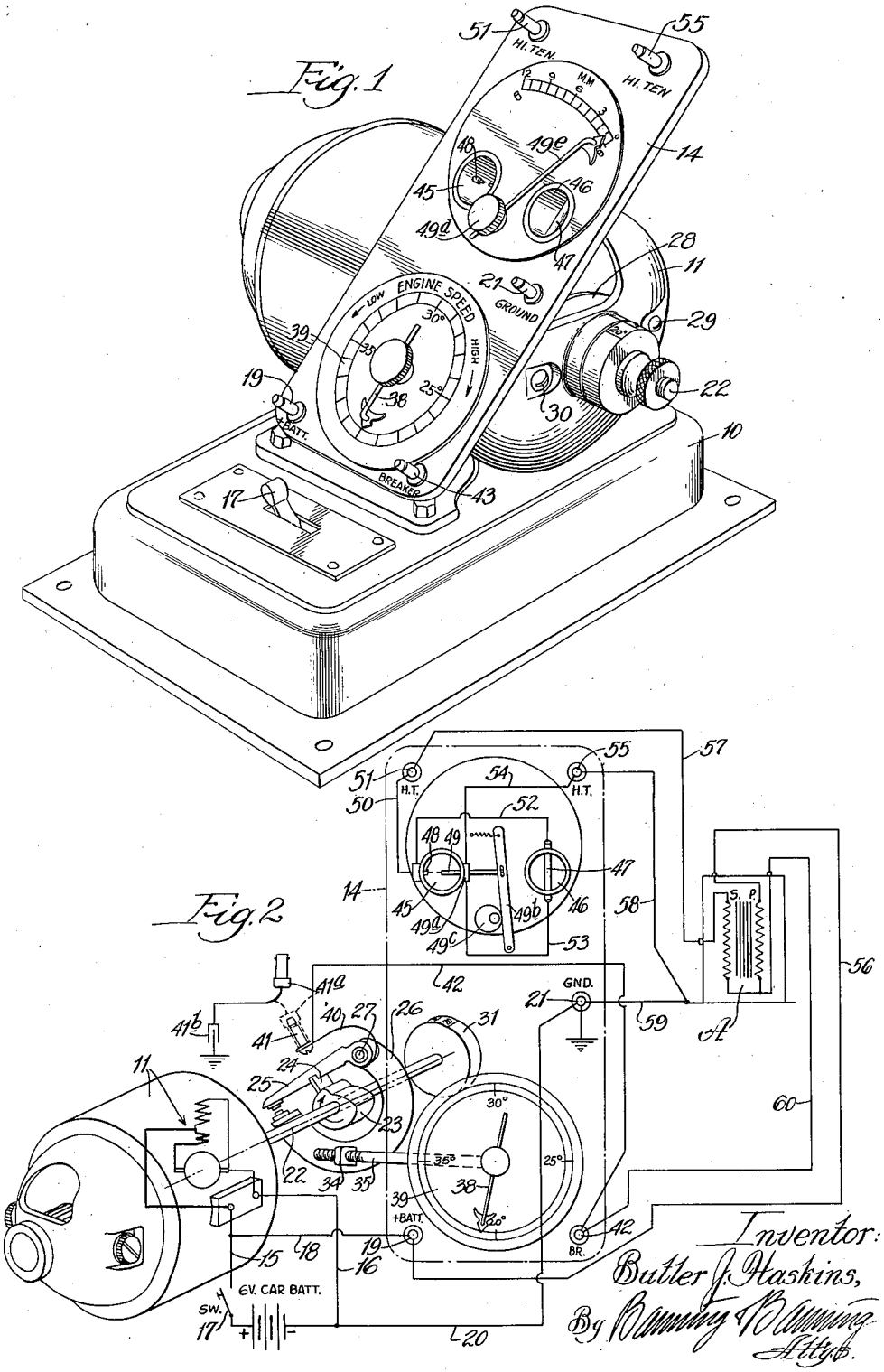

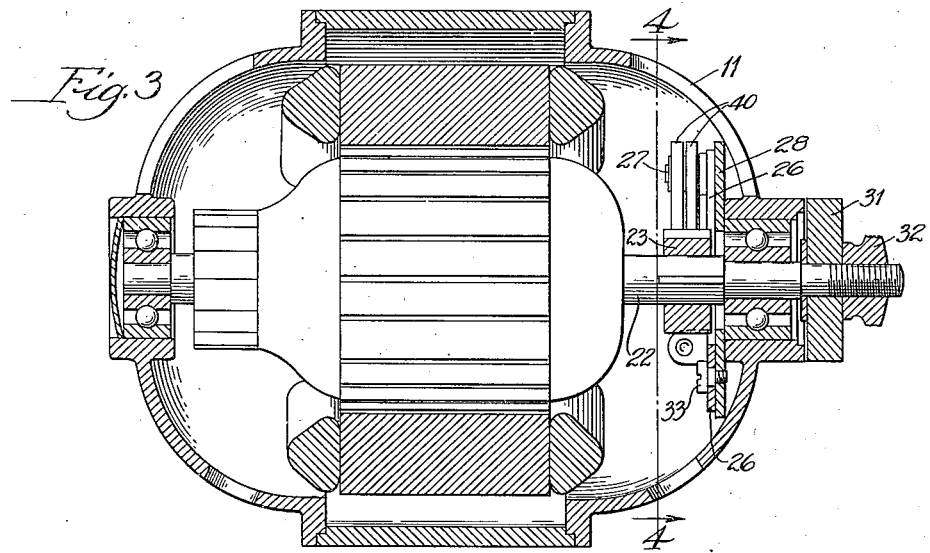
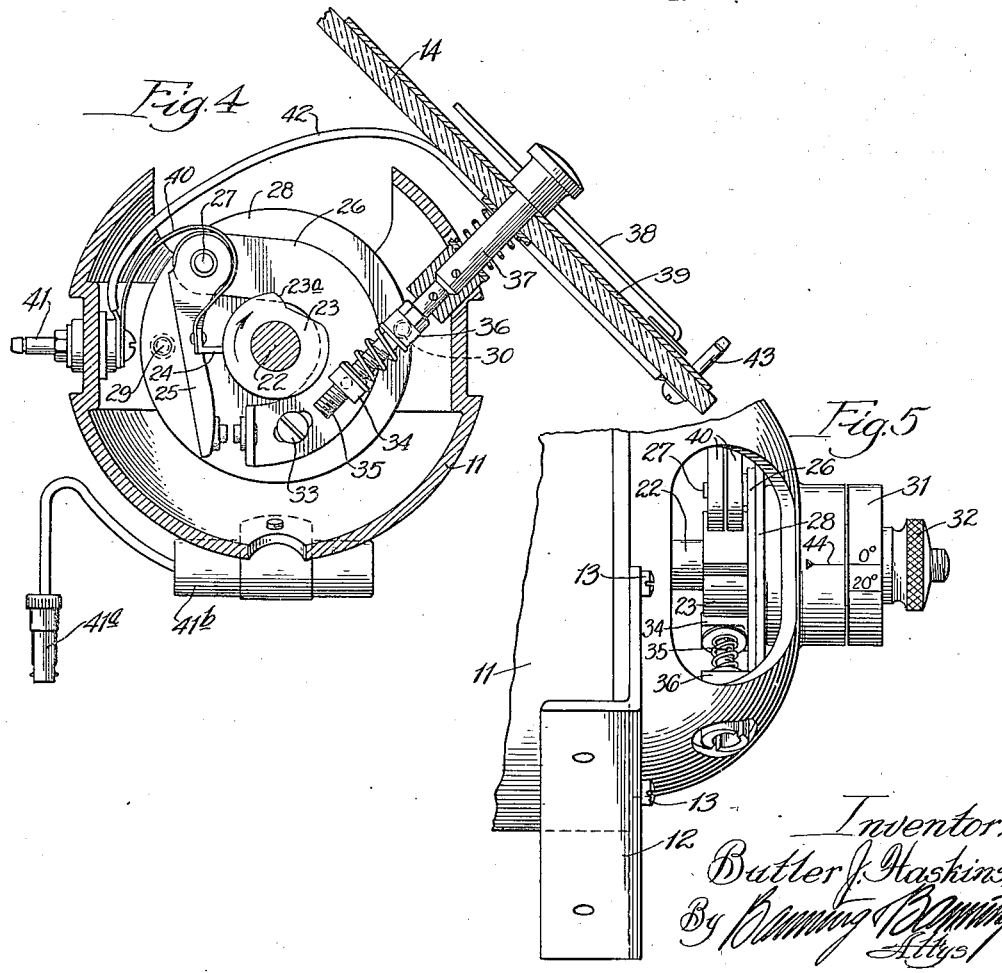

Patented Feb. 12, 1935

1,990,485

UNITED STATES PATENT OFFICE 1,990,485

COMPENSATED COIL TESTING APPARATUS

Butler J. Haskins, Chicago, Ill., assignor to Joseph Weidenhoff, Inc., Chicago, Ill., a corporation of Illinois Application April 5, 1933, Serial No. 664,466
Renewed August 2, 1934

7 Claims. (Cl. 175—183)

This invention relates to apparatus for testing automobile ignition devices, such as spark coils, spark plugs, high tension leads, and the like.

An object of this invention is to provide means in apparatus of this type for automatically compensating for variations in voltages of batteries of automobiles being tested.

Another object is to provide a neater and more compact form of such testing device, and particularly one which can be operated entirely by standard automobile equipment, and without the use of power from an outside source.

Still another object is to provide means for readily setting the breaker mechanism for a predetermined angle of contact of the breaker points.

These and other objects, as will hereinafter appear, are accomplished by this invention which is fully described in the following specification and shown in the accompanying drawings, in which—

Figure 1 is a perspective view of the testing device;

Fig. 2 is a wiring diagram of the same showing parts of the motor disassembled;

Fig. 3 is a longitudinal section through the motor;

Fig. 4 is a transverse section on the line 4—4 of Fig. 3; and

Fig. 5 is a partial side elevation of the same.

This is an improvement on the testing apparatus shown and described in my application Serial No. 645,521, filed December 3, 1932.

The device as illustrated comprises a suitable base 10 upon which is mounted a direct current motor 11 adapted to operate on a six-volt source of direct current, such as the battery of an automobile whose ignition system is being tested. One advantage of this is that this testing device is self-contained and requires no outside source of power for its operation.

A bracket 12 is attached to the motor in any suitable manner, such as by screws 13, and to this is secured a panel 14 of a flat insulating material, such as a phenolic condensation product. This panel carries a dial upon which is indicated the angle of contact of the breaker points as well as a spark gap and neon tube for indicating the intensity of a spark as produced, together with a dial showing the distance between the points of the spark gap.

Referring to Fig. 2, the motor is compound wound for a purpose which will later be described, and is operatively connected to the car battery by means of leads 15 and 16, and controlled by a switch 17. The positive lead 15 also connects through a lead 18 with a terminal 19 of the panel, while the negative lead 16 connects through a lead 20 with the grounded terminal 21 of the panel. The motor has a motor shaft 22 whose length is here exaggerated to show the parts carried by it, the shaft being shown in Fig. 3 in correct size and carried in suitable journals. This shaft carries a cam 23 upon which operates a cam follower 24 which is carried by the breaker arm 25.

Referring to Fig. 4, the breaker arm 25 and the adjustable contact arm 26 are pivotally mounted by means of a common pin 27 which is carried by a circular standard breaker plate 28. The latter is secured to the end of the motor within which it is enclosed by means of suitable screws 29, 30. These pass through holes which permit this plate to be moved somewhat for the purpose of adjustment, as will later be explained.

The outer end of the motor shaft is reduced and shouldered to provide a stud upon which is rotatably mounted a collar 31 which may be adjustably locked in place on the shaft by means of a nut 32. The adjustable contact arm 26 is guided by means of a shoulder screw 33 and has a nut 34 pivotally connected thereto, and threaded to receive the screw-threaded pin 35, the opposite end of which is journaled in a lug 36 into which is threaded the inner end of the screw 30. A spindle 37 is releasably secured to the end of the pin 35, the spindle being journaled in the panel 14 and carrying a finger 38 movable over a dial 39 graduated in terms of degrees of the angle of contact made by the breaker points.

The cam 23 is preferably provided with a depression having a long sloping side at the closing end, and a relatively sharp lift 23ᵃ at the opening end. It will be understood that the breaker arm 25 is suitably insulated from the plate 28 and arm 26 which are grounded. The breaker arm is connected through a lead 40 with a terminal 41 which is insulated from the motor frame and also through a lead 42 to a terminal 43 on the panel. Where the spark coil to be tested has no condenser of its own, the terminal 41 is connected through a clip 41ᵃ, as shown in dotted lines, to a condenser 41ᵇ, the opposite side of the condenser being grounded. When, however, the spark coil A to be tested has a condenser of its own, the clip 41ᵃ is removed from the terminal 41, as shown in full lines.

The angle of contact of the breaker points is controlled and varied by means of the pin 35 which is threaded through the nut 34, the position of the pin 35 being indicated by the position of the finger 38 on the graduated dial 39, as has been previously explained. As a check on the setting of the finger 38, the collar 31 has two graduations, as shown in Fig. 5, namely, 0° and 20°, with graduations placed 20° apart on the periphery of the collar. The motor shaft is turned slowly by hand until the breaker points close with the finger 38 set at 20° on the dial 39. The 0° indication on the collar 31 should now be exactly opposite the mark 44, as shown in Fig. 5. If it does not fall at this point the nut 32 is loosened, and the collar turned, so that it does come immediately in front of the mark 44, after which the nut is tightened. The motor shaft is now rotated in a counterclockwise direction until the cam just begins to lift the breaker arm 25, thereby opening the breaker points. If the setting of the finger 38 is correct the 20° mark on the collar 31 will be opposite the mark 44 as the points open. If not, the screws 29 and 30 are loosened and the plate adjusted laterally a small amount so as to move the breaker arm toward or from the cam, depending on whether the previous reading showed the cam angle was more or less than the desired 20°. The screws 29 and 30 are then set and the angle again read. If it is now 20°, as shown by the collar 31, the setting is correct. With the finger 38 set at 20° on the scale 39, as previously described, other readings of the angle of contact both more than 20° and less than 20° will then be indicated by the position of the finger 38 on the scale.

On the upper panel 14 are mounted two tubes 45 and 46 of suitable insulating material, the former being provided with a variable spark gap, and the latter with a neon tube 47. The spark gap has a stationary metal point or element 48 and a movable element 49 slidably mounted in a metallic guide 49a. The stationary element 48 is connected through a lead 50 with a high tension plug 51, and also through a lead 52 to one side of the neon tube 47. The opposite side of the neon tube is connected through a lead 53 with a guide 49a, so that the neon tube is placed in parallel with the spark gap. The guide 49a is connected through a lead 54 with a high tension plug 55.

The movable element 49 is pivotally connected to a lever 49b which is pivotally mounted at its lower end and drawn by means of a spring against a cam 49c on a shaft which is controlled by a knob 49d having a pointer 49e (Fig. 1), which is movable over a scale preferably graduated in millimeters of opening of the spark gap. By turning the knob the gap may be varied and the opening of the gap read in millimeters on the scale.

A spark coil A to be tested is connected as shown in Fig. 2, the primary terminal being connected through a lead 56 with the battery terminal 19 of the panel. The high tension terminal is connected through a lead 57 with the high tension terminal 51, while the ground terminal on the cam of the spark coil is connected through a lead 58 to the high tension terminal 55, and through a lead 59 to the ground terminal 21 of the panel. The common connection of the windings of the spark coil is connected through a lead 60 with the breaker terminal 43.

When thus connected, the switch 17 may be closed, thereby driving the motor shaft at a predetermined speed which will give a definite time of closure for the contact points, depending upon the speed of the shaft and upon the angle of contact. The degree of energization of the spark coil will depend upon the time of contact of the breaker points, and also upon the voltage of the car battery.

Thus it will be seen that the present invention automatically corrects for the voltage of the car battery within the usual limits of the voltages of such a battery, so that in testing a spark coil the operator will not have to make any corrections for the car battery voltage. This is accomplished by providing a motor 11 which is compound wound so that if the voltage of the battery is above an average of say six volts, the motor will run enough faster to shorten the time of contact, so that the primary of the spark coil will be energized to a lesser degree. This is enough to make up for the difference in voltage, so that when the break occurs at the breaker points the spark generated across the gap 48, 49 will be substantially equal to that produced by a car battery operating at a normal six volts potential. Likewise if the car battery is below six volts the motor will run enough slower to make up for the decreased energization of the primary of the spark coil by a longer time of energization. The present factory standards are based on a spark produced by a six volt battery energizing a standard spark coil through a 20° angle of contact with the cam operating at 1200 R. P. M.

The tests of the spark coil, spark plugs, high tension leads, etc., are then made in the manner set forth in my previous patent applications but are simplified, as herein described.

The points of make and break can be determined by the feel of the knob as the motor shaft is turned by hand. It can also be determined by means of a battery and a light in series circuit with the breaker points in a manner well known in this art.

While I have shown and described but a few embodiments of my invention, it is to be understood that it is capable of many modifications. Changes, therefore, in the construction and arrangement may be made which do not depart from the spirit and scope of my invention as disclosed in the appended claims.

I claim:

1. In testing apparatus of the class described, a direct current electric motor having a frame, a shaft journaled therein, a make and break device enclosed within the motor frame having a cam on said shaft, said make and break device being adapted to be connected in series circuit with the primary winding of a spark coil to be tested, a spark gap adapted to be connected in series circuit with the secondary winding of the spark coil, said motor being adapted to operate on a car battery and being wound so that the voltage of the car battery will be compensated whereby the spark produced at the spark gap will be of substantially the same intensity for different battery voltages while the gap remains constant.

2. In testing apparatus of the class described, a direct current electric motor having a frame, a shaft journaled therein, a make and break device having a cam on said shaft, said make and break device being adapted to be connected in series circuit with the primary winding of a spark coil to be tested, a spark gap adapted to be connected in series circuit with the secondary winding of the spark coil, said motor being adapted to operate on a car battery and being compound wound so that the voltage of the car battery will be compensated whereby the spark produced at the spark gap will be of substantially the same intensity for different battery voltages while the gap remains constant, and means for indicating the angle of contact of the make and break device.

3. In testing apparatus of the class described, a direct current electric motor having a frame, a shaft journaled therein, a make and break device having a cam on said shaft, said make and break device being adapted to be connected in series circuit with the primary winding of a spark coil to be tested, a spark gap adapted to be connected in series circuit with the secondary winding of the spark coil, said motor being adapted to operate on a car battery and being wound so that the voltage of the car battery will be compensated whereby the spark produced at the spark gap will be of substantially the same intensity for different battery voltages while the gap remains constant, a panel, and means for indicating the angle of contact of the make and break device, the spark gap and indicating means being mounted on the panel.

4. In testing apparatus of the class described, a frame, a shaft journaled therein, a cam on said shaft, a plate adjustably secured on said frame and movable toward and from the shaft, a breaker arm hingedly mounted on the plate and insulated therefrom and having a contact point adapted to engage a relatively fixed point on the plate and carrying a cam follower adapted to bear on the cam, means urging the breaker arm toward the cam, and a collar adjustably secured on the shaft and having indicia movable in front of an indicator on the frame whereby the breaker arm and collar may be adjusted to cause the breaker points to open and close at the points of the indicia on the collar.

5. In testing apparatus of the class described, a frame, a shaft journaled therein, a cam on said shaft, a plate adjustably secured on said frame and movable toward and from the shaft, a breaker arm hingedly mounted on the plate and insulated therefrom and having a contact point adapted to engage a relatively fixed point on the plate and carrying a cam follower adapted to bear on the cam, means urging the breaker arm toward the cam, a collar adjustably secured on the shaft and having indicia movable in front of an indicator on the frame whereby the breaker arm and collar may be adjusted to cause the breaker points to open and close at the points of the indicia on the collar, adjusting means for moving the relatively fixed point toward and from the breaker arm to vary the angle of contact of the points, a graduated scale, and a pointer movable over the graduated scale for indicating the setting of the adjusting means.

6. In testing apparatus of the class described, a frame, a shaft journaled therein, a cam on said shaft, a plate adjustably secured on said frame and movable toward and from the shaft, a breaker arm hingedly mounted on the plate and insulated therefrom and having a contact point adapted to engage a relatively fixed point on the plate and carrying a cam follower adapted to bear on the cam, means urging the breaker arm toward the cam, a collar adjustably secured on the shaft and having indicia movable in front of an indicator on the frame whereby the breaker arm and collar may be adjusted to cause the breaker points to open and close at the points of the indicia on the collar, adjusting means for moving the relatively fixed point toward and from the breaker arm to vary the angle of contact of the points, a graduated scale, and a pointer movable over the graduated scale for indicating the setting of the adjusting means, the scale being graduated in degrees of angle of the closure of the cam.

7. In testing apparatus of the class described, a frame, a shaft journaled therein, a cam on said shaft, a plate adjustably secured on said frame and movable toward and from the shaft, a breaker arm hingedly mounted on the plate and insulated therefrom and having a contact point adapted to engage a relatively fixed point on the plate and carrying a cam follower adapted to bear on the cam, means urging the breaker arm toward the cam, a collar adjustably secured on the shaft and having indicia movable in front of an indicator on the frame whereby the breaker arm and collar may be adjusted to cause the breaker points to open and close at the points of the indicia on the collar, adjusting means for moving the relatively fixed point toward and from the breaker arm to vary the angle of contact of the points, a graduated scale, and a pointer movable over the graduated scale for indicating the setting of the adjusting means, the indicia on the collar corresponding to one setting of the pointer on the graduated scale.

BUTLER J. HASKINS.